US011261751B2

(12) United States Patent
Golfin et al.

(10) Patent No.: US 11,261,751 B2
(45) Date of Patent: Mar. 1, 2022

(54) COMPRESSOR OPERABILITY CONTROL FOR HYBRID ELECTRIC PROPULSION

(71) Applicant: United Technologies Corporation, Farmington, CT (US)

(72) Inventors: David A. Golfin, Middletown, CT (US); Neil Terwilliger, Meriden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 161 days.

(21) Appl. No.: 16/511,276

(22) Filed: Jul. 15, 2019

(65) Prior Publication Data

US 2021/0017878 A1   Jan. 21, 2021

(51) Int. Cl.
| | |
|---|---|
| F01D 15/10 | (2006.01) |
| F01D 13/02 | (2006.01) |
| F01D 15/12 | (2006.01) |
| F01D 17/08 | (2006.01) |
| F02C 3/113 | (2006.01) |

(52) U.S. Cl.
CPC ............ *F01D 15/10* (2013.01); *F01D 13/02* (2013.01); *F01D 15/12* (2013.01); *F01D 17/08* (2013.01); *F02C 3/113* (2013.01)

(58) Field of Classification Search
CPC .......... F01D 15/10; F01D 15/12; F01D 17/08; F01D 13/02; F02C 3/113
USPC .......................................................... 290/52
See application file for complete search history.

(56) References Cited

U.S. PATENT DOCUMENTS

| 7,788,898 B2 | 9/2010 | Kern et al. |
|---|---|---|
| 8,459,038 B1 | 6/2013 | Lickfold et al. |
| 2010/0251726 A1 | 10/2010 | Jones et al. |

(Continued)

FOREIGN PATENT DOCUMENTS

| EP | 1712761 A2 | 10/2006 |
|---|---|---|
| EP | 3412575 A1 | 12/2018 |
| EP | 3421372 A1 | 1/2019 |

(Continued)

OTHER PUBLICATIONS

EP Application No. 20186056.6 Extended EP Search Report dated Dec. 8, 2020, 7 pages.

*Primary Examiner* — Charles Reid, Jr.
(74) *Attorney, Agent, or Firm* — Cantor Colburn LLP (57) ABSTRACT

A hybrid electric propulsion system includes a gas turbine engine having a low speed spool and a high speed spool. The low speed spool includes a low pressure compressor and turbine, and the high speed spool includes a high pressure compressor and turbine. The hybrid electric propulsion system includes an electric generator configured to extract power from the low speed spool, an electric motor configured to augment rotational power of the high speed spool, and a controller. The controller is operable to determine a target operating condition of the low pressure compressor to achieve a compressor stability margin in the gas turbine engine, determine a current operating condition of the low pressure compressor, and control a power transfer between the electric generator of the low speed spool and the electric motor of the high speed spool to adjust the current operating condition based on the target operating condition.

20 Claims, 6 Drawing Sheets

(56) References Cited

U.S. PATENT DOCUMENTS

2013/0236296 A1    9/2013  Collopy et al.
2018/0354631 A1* 12/2018  Adibhatla ................. F02C 9/42

FOREIGN PATENT DOCUMENTS

| EP | 3421760 A1 | 1/2019 | |
| EP | 3480433 A1 | 5/2019 | |
| EP | 3623203 A1 | 3/2020 | |
| WO | WO-2008045058 A1 * | 4/2008 | ............... F02K 1/16 |

* cited by examiner

COMPRESSOR OPERABILITY CONTROL FOR HYBRID ELECTRIC PROPULSION

BACKGROUND

The subject matter disclosed herein generally relates to rotating machinery and, more particularly, to a method and an apparatus for compressor operability control for hybrid electric propulsion.

Gas turbine engines typically include multiple spools with a compressor section and a turbine section on opposite sides of a combustor section in an engine core. As an example, in a two-spool design, fuel in air that has been compressed by a low pressure compressor (LPC) followed by a high pressure compressor (HPC) of the compressor section is combusted. The combustion takes place in the combustor section to create heated gases with increased pressure and density. The heated gases are used to rotate a high pressure turbine (HPT) followed by a low pressure turbine (LPT) in the turbine section that are used to produce thrust or power. Air flows through the compressor and turbine sections differ at various operating conditions of an engine, with more air flow being required at higher output levels and vice versa. Aerodynamic interaction between the LPC and HPC with respect to speed can impact compressor stability in the compressor section. To maintain compressor stability, engine bleeds are typically used to extract engine bleed air; however, the use of engine bleeds can detract from performance and efficiency of an engine. An alternate approach to enhance engine stability is to control vane angles of variable stator vanes within the compressor section. Active control of variable stator vanes can improve air flow and prevent stalling within the compressor section but can also result in increased inter-turbine temperatures between the HPT and LPT along with higher exhaust gas temperatures, which may impact engine component lifespan.

BRIEF DESCRIPTION

According to one embodiment, a hybrid electric propulsion system includes a gas turbine engine having a low speed spool and a high speed spool. The low speed spool includes a low pressure compressor and a low pressure turbine, and the high speed spool includes a high pressure compressor and a high pressure turbine. The hybrid electric propulsion system also includes an electric generator configured to extract power from the low speed spool, an electric motor configured to augment rotational power of the high speed spool, and a controller. The controller is operable to determine a target operating condition of the low pressure compressor to achieve a compressor stability margin in the gas turbine engine, determine a current operating condition of the low pressure compressor, and control a power transfer between the electric generator of the low speed spool and the electric motor of the high speed spool to adjust the current operating condition based on the target operating condition.

In addition to one or more of the features described above or below, or as an alternative, further embodiments may include where the target operating condition of the low pressure compressor is determined by the controller with respect to one or more engine properties that enable an estimate of stability of the low pressure compressor.

In addition to one or more of the features described above or below, or as an alternative, further embodiments may include where the one or more engine properties include one or more of: a vane angle, a compressor corrected speed, a compressor pressure ratio, a compressor flow corrected at compressor inlet properties, and a compressor flow corrected at compressor exit properties.

In addition to one or more of the features described above or below, or as an alternative, further embodiments may include where the target operating condition is based on a target pressure ratio of the low pressure compressor associated with a low pressure compressor corrected air flow, the current operating condition includes a current pressure ratio of the low pressure compressor and a current corrected flow, and the low pressure compressor corrected air flow and the current pressure ratio are adjusted based on the target pressure ratio.

In addition to one or more of the features described above or below, or as an alternative, further embodiments may include where the controller is further configured to adjust the target pressure ratio based on a rate of change in speed of the low pressure compressor.

In addition to one or more of the features described above or below, or as an alternative, further embodiments may include where an exhaust gas temperature of the gas turbine engine is reduced based on transferring power between the electric generator of the low speed spool and the electric motor of the high speed spool while maintaining a substantially constant thrust.

In addition to one or more of the features described above or below, or as an alternative, further embodiments may include where the controller is further configured to transfer power from the electric generator to an energy storage system.

In addition to one or more of the features described above or below, or as an alternative, further embodiments may include where the controller is further configured to transfer power from the energy storage system to the electric motor.

In addition to one or more of the features described above or below, or as an alternative, further embodiments may include where the controller is further configured to transfer power from the electric generator to the electric motor of the high speed spool absent a change in output of a low pressure compressor vane actuator of the gas turbine engine.

In addition to one or more of the features described above or below, or as an alternative, further embodiments may include where the target operating condition includes a target pressure ratio associated with a combination of low pressure compressor corrected air flow and vane angle.

According to an embodiment, a method for controlling a hybrid electric propulsion system includes determining, by a controller, a target operating condition of a low pressure compressor to achieve a compressor stability margin in a gas turbine engine having a low speed spool and a high speed spool, the low speed spool including the low pressure compressor and a low pressure turbine, and the high speed spool including a high pressure compressor and a high pressure turbine. The controller determines a current operating condition of the low pressure compressor. A power transfer between an electric generator of the low speed spool and an electric motor of the high speed spool is controlled to adjust the current operating condition of the low pressure compressor based on the target operating condition.

In addition to one or more of the features described above or below, or as an alternative, further embodiments may include transferring power from the electric generator to an energy storage system.

In addition to one or more of the features described above or below, or as an alternative, further embodiments may include transferring power from the energy storage system to the electric motor.

In addition to one or more of the features described above or below, or as an alternative, further embodiments may include transferring power from the electric generator to the electric motor of the high speed spool absent a change in output of a low pressure compressor vane actuator of the gas turbine engine.

A technical effect of the apparatus, systems and methods is achieved by performing compressor operability control for a hybrid electric propulsion system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
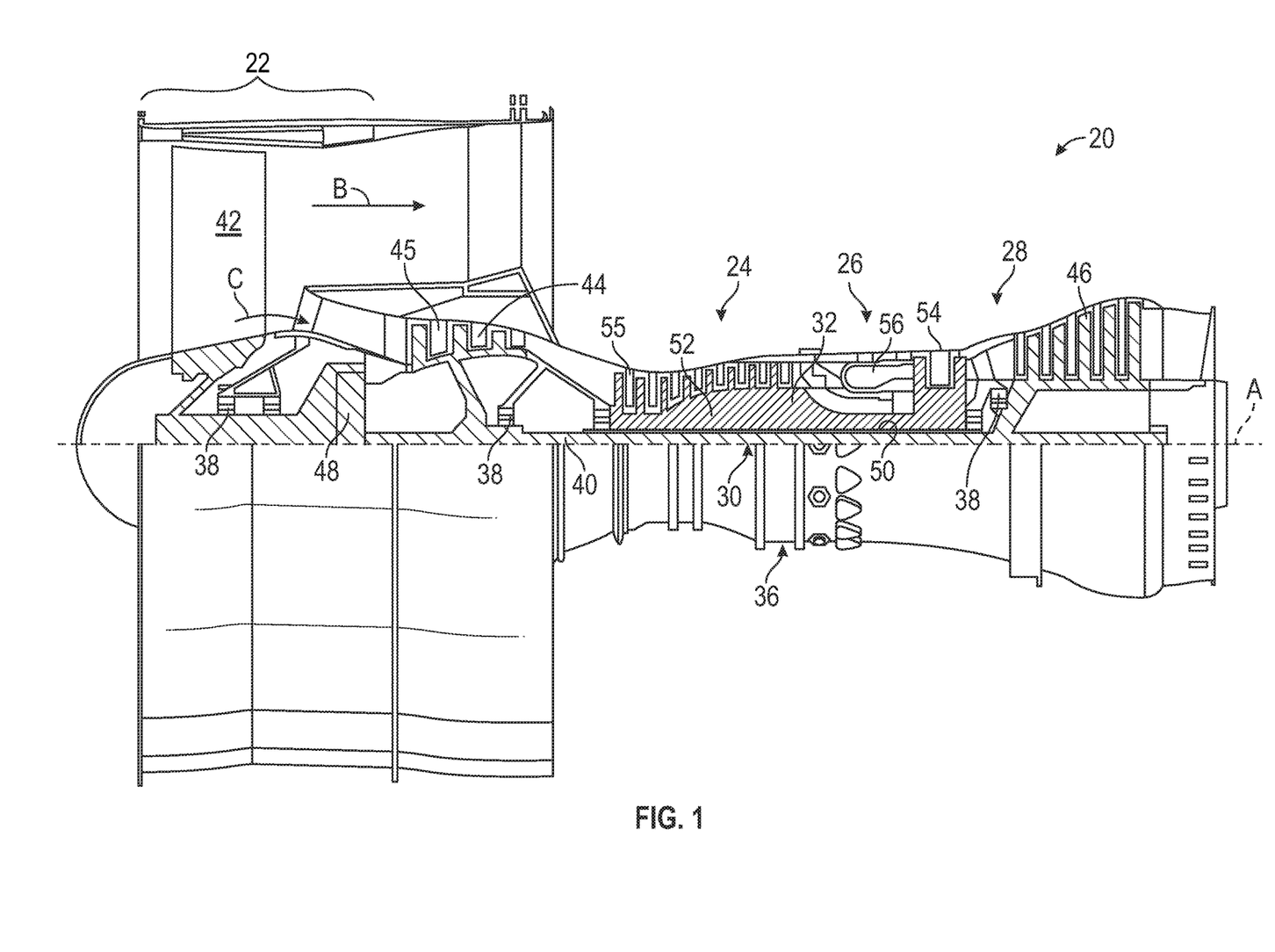
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
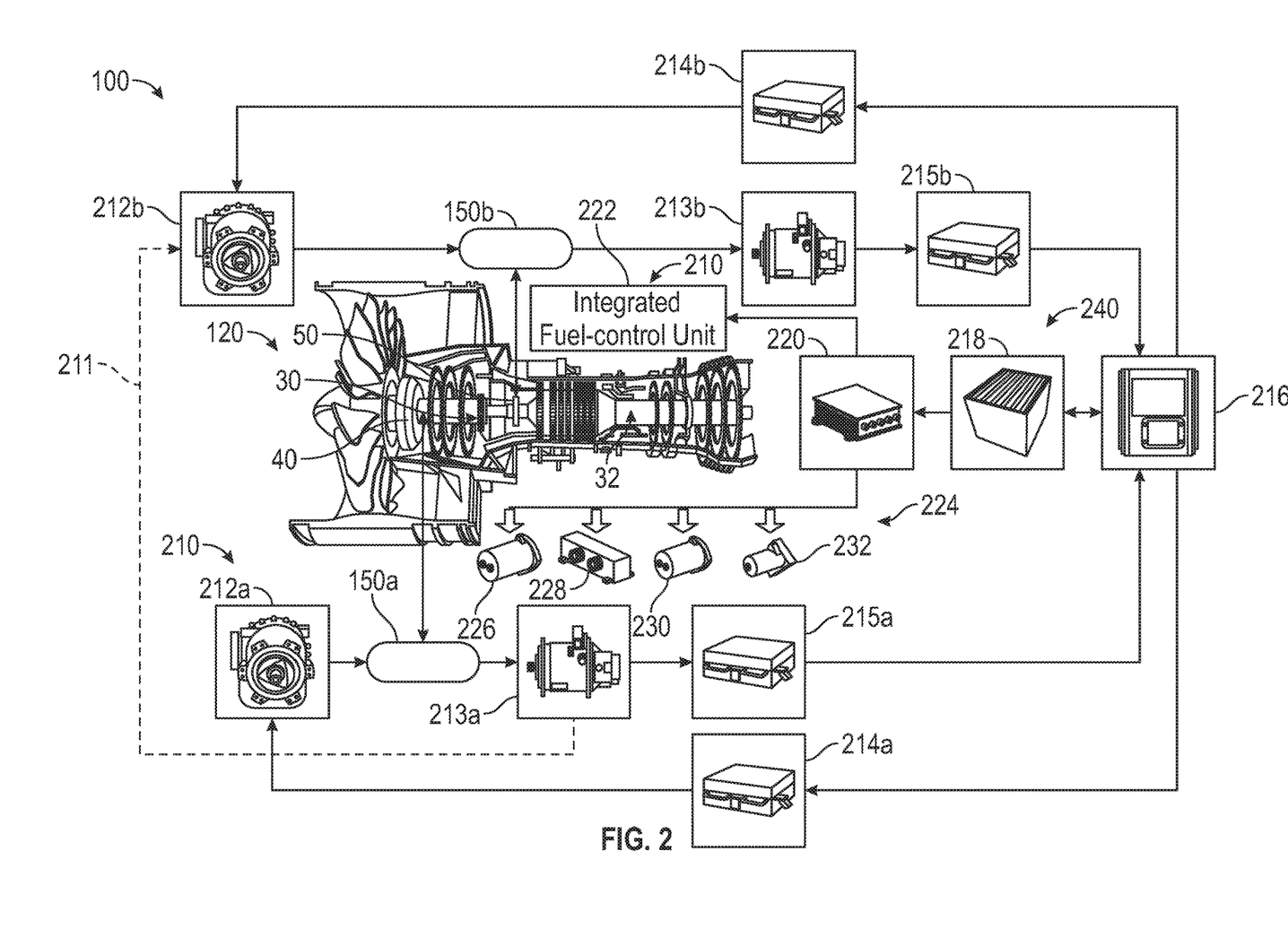
FIG. 2 is a schematic diagram of a hybrid electric propulsion system with physical power flow connections (electrical and mechanical power), in accordance with an embodiment of the disclosure.

FIG. 2 illustrates a hybrid electric propulsion system 100 (also referred to as hybrid gas turbine engine 100) including a gas turbine engine 120 operably coupled to an electrical power system 210 as part of a hybrid electric aircraft. One or more mechanical power transmissions 150 (e.g., 150A, 150B) can be operably coupled between the gas turbine engine 120 and the electrical power system 210. The gas turbine engine 120 can be an embodiment of the gas turbine engine 20 of FIG. 1 and includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50 as depicted in FIG. 1). The electrical power system 210 can include a first electric motor 212A configured to augment rotational power of the low speed spool 30 and a second electric motor 212B configured to augment rotational power of the high speed spool 32. Although two electric motors 212A, 212B are depicted in FIG. 2, it will be understood that there may be only a single electric motor (e.g., only electric motor 212B) or additional electric motors (not depicted). The electrical power system 210 can also include a first electric generator 213A configured to convert rotational power of the low speed spool 30 to electric power and a second electric generator 213B configured to convert rotational power of the high speed spool 32 to electric power. Although two electric generators 213A, 213B are depicted in FIG. 2, it will be understood that there may be only a single electric generator (e.g., only electric generator 213A) or additional electric generators (not depicted). In some embodiments, one or more of the electric motors 212A, 212B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the first electric motor 212A and first electric generator 213A. The mechanical power transmission 150B can include a gearbox operably coupled between the outer shaft 50 and a combination of the second electric motor 212B and second electric generator 213B. In embodiments where the electric motors 212A, 212B are configurable between a motor and generator mode of operation, the mechanical power transmission 150A, 150B can include a clutch or other interfacing element(s).

The electrical power system 210 can also include motor drive electronics 214A, 214B operable to condition current to the electric motors 212A, 212B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system 100. For example, power from the first electric generator 213A can be transferred 211 to the second electric motor 212B as a low speed spool 30 to high speed spool 32 power transfer. Other examples of power transfers may include a power transfer from the second electric generator 213B to the first electric motor 212A as a high speed spool 32 to low speed spool 30 power transfer.

A power conditioning unit 220 and/or other components can be powered by the energy storage system 218. The power conditioning unit 220 can distribute electric power to support actuation and other functions of the gas turbine engine 120. For example, the power conditioning unit 220 can power an integrated fuel control unit 222 to control fuel flow to the gas turbine engine 120. The power conditioning unit 220 can power a plurality of actuators 224, such as one or more of a low pressure compressor bleed valve actuator 226, a low pressure compressor vane actuator 228, a high pressure compressor vane actuator 230, an active clearance control actuator 232, and other such effectors. In some embodiments, the low pressure compressor vane actuator 228 and/or the high pressure compressor vane actuator 230 can be omitted where active control of stator vanes 45, 55 of FIG. 1 is not needed. Collectively, any effectors that can change a state of the gas turbine engine 120 and/or the electrical power system 210 may be referred to as hybrid electric system control effectors 240. Examples of the hybrid electric system control effectors 240 can include the electric motors 212A, 212B, electric generators 213A, 213B, integrated fuel control unit 222, actuators 224 and/or other elements (not depicted).

Figure 3:
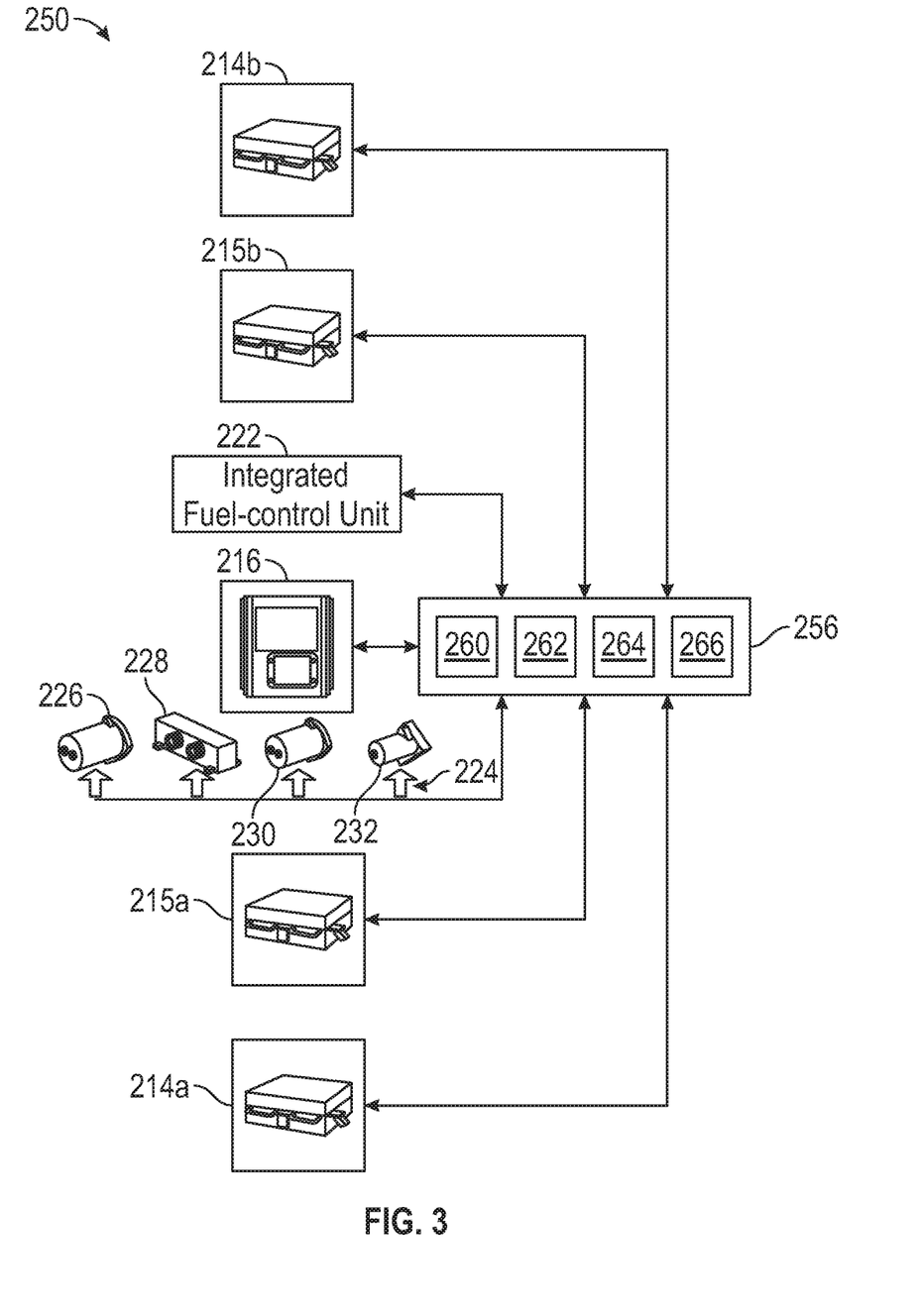
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, actuators 224, and/or other components (not depicted) of the hybrid electric propulsion system 100. In embodiments, the controller 256 can control and monitor for fault conditions of the gas turbine engine 120 and/or the electrical power system 210. For example, the controller 256 can be integrally formed or otherwise in communication with a full authority digital engine control (FADEC) of the gas turbine engine 120. In embodiments, the controller 256 can include a processing system 260, a memory system 262, and an input/output interface 264. The controller 256 can also include various operational controls, such as a power transfer control 266 that controls the hybrid electric system control effectors 240 as further described herein.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, actuators 224, and/or other components (not depicted) of the hybrid electric propulsion system 100. The controller 256 provides a means for controlling the hybrid electric system control effectors 240 based on a power transfer control 266 that is dynamically updated during operation of the hybrid electric propulsion system 100. The means for controlling the hybrid electric system control effectors 240 can be otherwise subdivided, distributed, or combined with other control elements.

The power transfer control 266 can apply control laws and access/update models to determine how to control and transfer power to and from the hybrid electric system control effectors 240. For example, sensed and/or derived parameters related to speed, flow rate, pressure ratios, temperature, thrust, and the like can be used to establish operational schedules and transition limits to maintain efficient operation of the gas turbine engine 120. To maintain operational stability of the compressor section 24 of FIG. 1, the power transfer control 266 can control the hybrid electric system control effectors 240 to selectively transfer power between the low speed spool 30 and the high speed spool 32 of FIG. 1. A compressor map or other control schedules can define relationships between multiple operating parameters of the gas turbine engine 120. Schedules may seek to operate the compressor section 24 close to a stall line under certain operating conditions for efficient operation without resulting in a stall event. A stall line can be considered a stability limit line or a "not-to-exceed" operating line, with a stall margin providing a protective operating margin to avoid a stall event. To maintain a stall margin, one approach is control the low pressure compressor bleed valve actuator 226 to selectively open engine bleeds; however, this may result in reduced operating efficiency if the compressed bleed air is dumped overboard or not otherwise used. An alternate approach is to control the low pressure compressor vane actuator 228 and/or the high pressure compressor vane actuator 230 to adjust vane angles of the stator vanes 45, 55 and modify a compressor ratio and/or a compressor air flow of the compressor section 26. Such vane-based adjustments avoid the loss of compressed air through engine bleeds but may result in higher downstream temperatures. In exemplary embodiments, the power transfer control 266 can control a power transfer between the first electric generator 213A of the low speed spool 30 and the second electric motor 212B of the high speed spool 32 to adjust a current operating condition of the gas turbine engine 120 based on a target operating condition for increasing stability in the compressor section 24. The power transfer from the low speed spool 30 to the high speed spool 32 shifts the relationship between the speed of the low speed spool 30 and the high speed spool 32 while the power transfer is active. This results in the same speed (e.g., N1) of the low speed spool 30 with a higher speed (N2) of the high speed spool 32 based on the power transfer. Thus, a conventional relationship between a pressure ratio of the low pressure compressor 44 and a low pressure compressor air flow is shifted and may result in a reduced value of the pressure ratio of the low pressure compressor 44 and an increased value of the low pressure compressor air flow.

In embodiments, the power transfer control 266 can determine a low pressure compressor stability margin for combinations of engine properties, including vane angle, compressor corrected speed, a compressor pressure ratio, a compressor flow corrected at compressor inlet properties, and compressor flow corrected at compressor exit properties. A simplified model can be created and used in flight. As one example, a minimum compressor inlet flow corrected to compressor exit properties can be tabulated as a function of vane angle and compressor corrected speed such that low pressure compressor operability is satisfied with the combination or a higher corrected flow. In flight, any time the calculated compressor corrected flow falls below a tabulated limit, power transfer from the low speed spool 30 to the high speed spool 32 can be increased. Power transfer may be requested to be higher than the limit for other reasons, and a minimum power transfer can be used to maintain a minimum exit-corrected flow and satisfy compressor operability. Alternatively, compressor operability margin may be actively calculated in an onboard model and a minimum operability margin may be reached by increasing power transfer.

Figure 4:
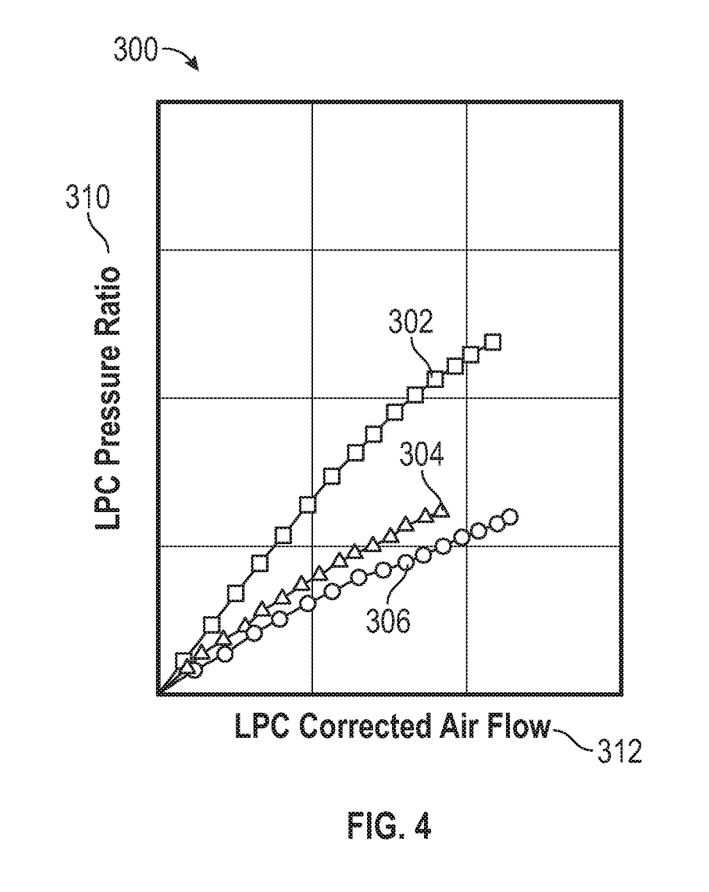
FIG. 4 is a plot that graphically illustrates a relationship between compressor pressure and compressor air flow in a gas turbine engine, in accordance with an embodiment of the disclosure.

Referring now to FIG. 4, plot 300 graphically illustrates a relationship between compressor pressure and compressor air flow in a gas turbine engine, such as the gas turbine engine 20, 120 of FIGS. 1 and 2. Line 302 illustrates an example relationship between a pressure ratio 310 of the low pressure compressor 44 and a low pressure compressor corrected air flow 312 under normal operating conditions without using the hybrid electric system control effectors 240 of FIGS. 2 and 3. Line 304 illustrates an example relationship between the pressure ratio 310 of the low pressure compressor 44 and the low pressure compressor corrected air flow 312 using the low pressure compressor vane actuator 228 and/or the high pressure compressor vane actuator 230 to adjust vane angles of the stator vanes 45, 55 to improve low pressure compressor stall margin. Line 306 illustrates an example relationship between the pressure ratio 310 of the low pressure compressor 44 and the low pressure compressor corrected air flow 312 using a power transfer between the first electric generator 213A of the low speed spool 30 and the second electric motor 212B of the high speed spool 32 to adjust a current operating condition of the gas turbine engine 120 to improve low pressure compressor stall margin. The lines 302 and 304 have higher values of the pressure ratio 310 of the low pressure compressor 44 as the low pressure compressor corrected air flow 312 increases, resulting in being closer to a stall event than line 306.

Figure 5:
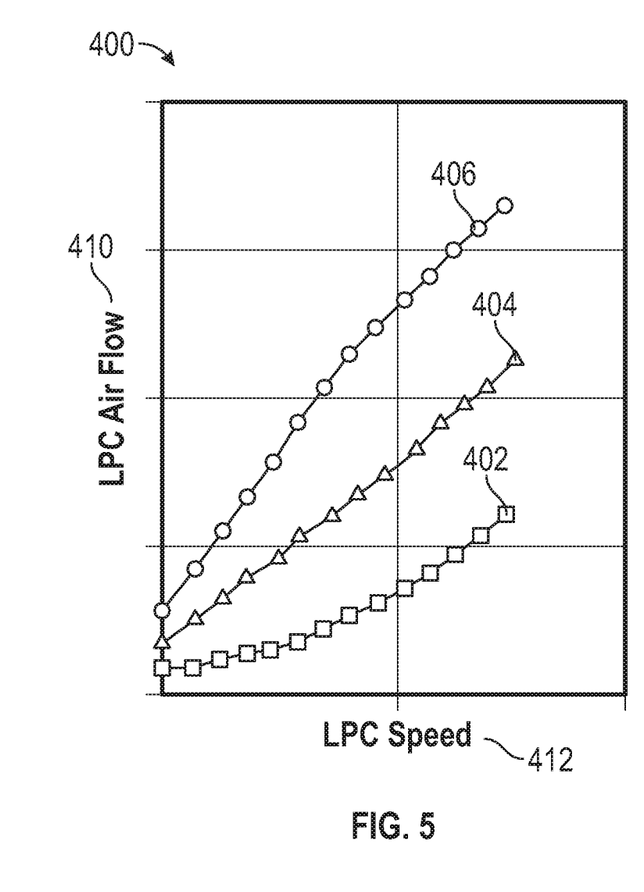
FIG. 5 is a plot that graphically illustrates a relationship between compressor air flow and compressor speed in a gas turbine engine, in accordance with an embodiment of the disclosure.

Referring now to FIG. 5, plot 400 graphically illustrates a relationship between compressor air flow and compressor speed in a gas turbine engine, such as the gas turbine engine 20, 120 of FIGS. 1 and 2. Line 402 illustrates an example relationship between a low pressure compressor air flow 410 and a speed 412 of the low pressure compressor 44 under normal operating conditions without using the hybrid electric system control effectors 240 of FIGS. 2 and 3. The low pressure compressor air flow 410 may differ from the low pressure compressor corrected air flow 312 of FIG. 4, for instance, using a different but related pressure associated with portions of the compressor section 24 of FIG. 1. The speed 412 may be corrected or normalized value of N1 speed. Line 404 illustrates an example relationship between the low pressure compressor air flow 410 and the speed 412 of the low pressure compressor 44 using the low pressure compressor vane actuator 228 and/or the high pressure compressor vane actuator 230 to adjust vane angles of the stator vanes 45, 55 to improve low pressure compressor stall margin. Line 406 illustrates an example relationship between the low pressure compressor air flow 410 and the speed 412 of the low pressure compressor 44 using a power transfer between the first electric generator 213A of the low speed spool 30 and the second electric motor 212B of the high speed spool 32 to adjust a current operating condition of the gas turbine engine 120 to improve low pressure compressor stall margin. The lines 402 and 404 have lower values of the low pressure compressor air flow 410 as the speed 412 of the low pressure compressor 44 increases. The air higher flow to speed relationship can provide a wider stall margin for the low pressure compressor 44.

Figure 6:
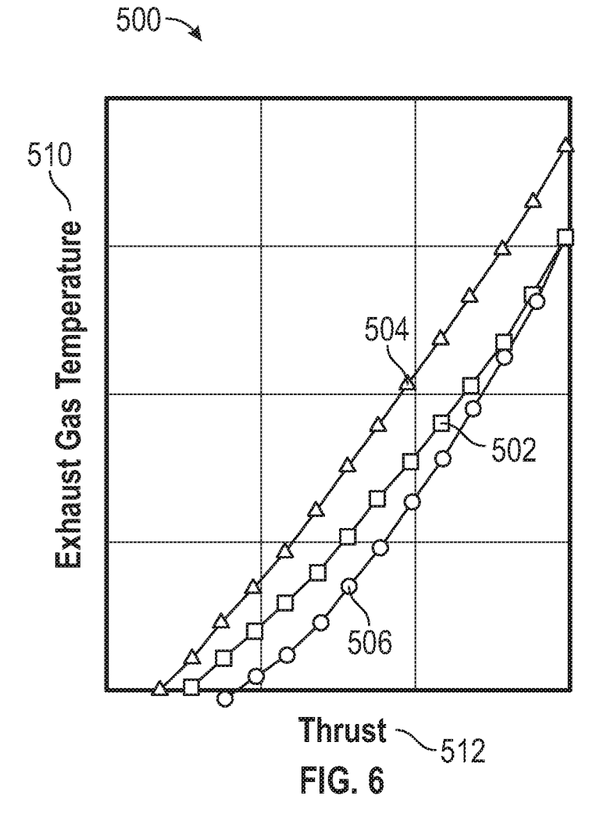
FIG. 6 is a plot that graphically illustrates a relationship between exhaust gas temperature and thrust in a gas turbine engine, in accordance with an embodiment of the disclosure.

Referring now to FIG. 6, plot 500 graphically illustrates a relationship between exhaust gas temperature 510 and thrust 512 in a gas turbine engine at medium to high power, such as the gas turbine engine 20, 120 of FIGS. 1 and 2. Line 502 illustrates an example relationship between exhaust gas temperature 510 and thrust 512 under normal operating conditions without using the hybrid electric system control effectors 240 of FIGS. 2 and 3. Line 504 illustrates an example relationship between exhaust gas temperature 510 and thrust 512 when improving low pressure compressor stall margin using the low pressure compressor vane actuator 228 and/or the high pressure compressor vane actuator 230 to adjust vane angles of the stator vanes 45, 55. Line 506 illustrates an example relationship between exhaust gas temperature 510 and thrust 512 using a power transfer between the first electric generator 213A of the low speed spool 30 and the second electric motor 212B of the high speed spool 32 to adjust a current operating condition of the gas turbine engine 120 to improve low pressure compressor stall margin. As can be seen in FIG. 6, at a given value of thrust 512, line 504 indicates a larger value of exhaust gas temperature 510 than line 502, and line 506 has a lower value of exhaust gas temperature 510 than both of lines 502, 504. Thus, even though the low pressure compressor stall margin has been improved from line 502 to either 504 or 506, line 506 has the additional benefit of reducing hot section temperatures while the conventional means of managing low pressure compressor margin (line 504) is detrimental to hot section temperatures and to engine life.

Figure 7:
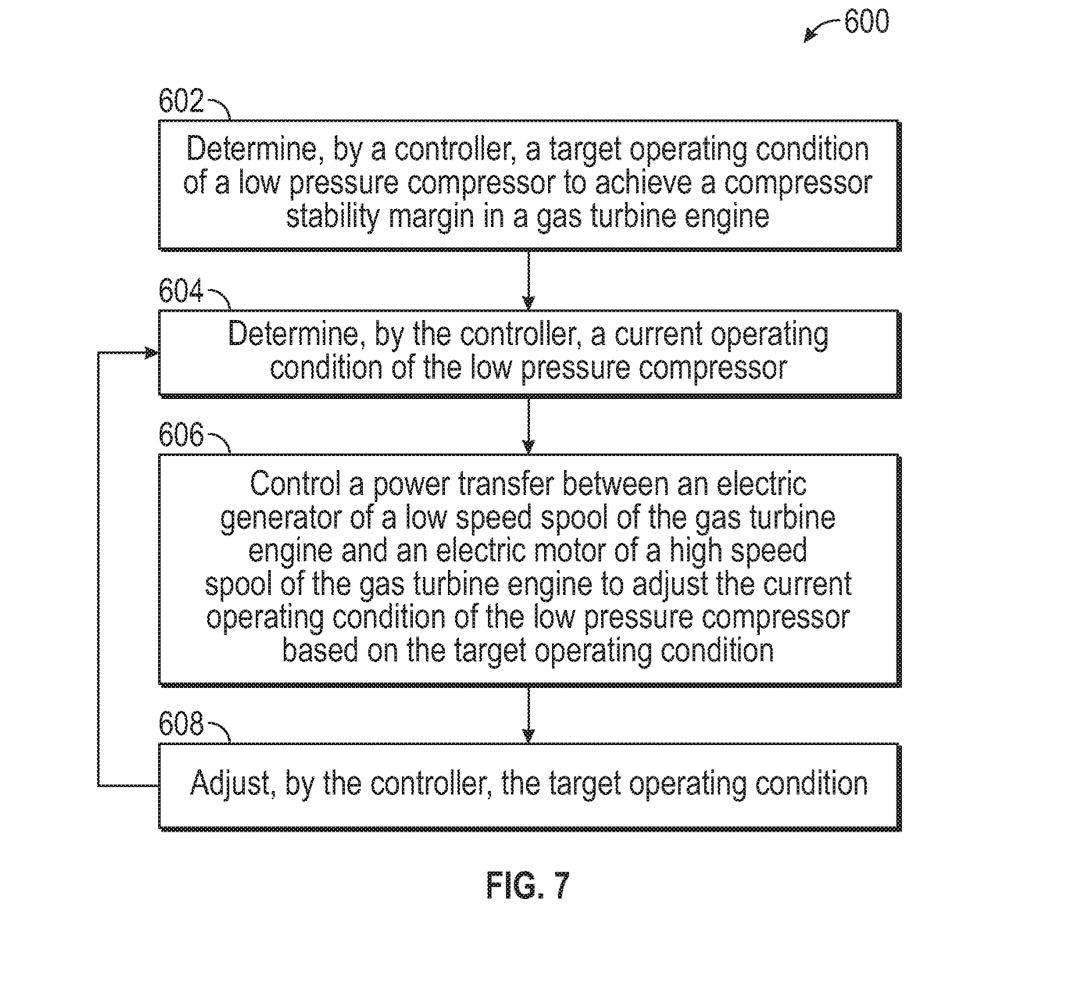
FIG. 7 is a flow chart illustrating a method, in accordance with an embodiment of the disclosure.

Referring now to FIG. 7 with continued reference to FIGS. 1-6, FIG. 7 is a flow chart illustrating a method 600 for compressor operability control for a hybrid electric propulsion system, in accordance with an embodiment. The method 600 may be performed, for example, by the hybrid electric propulsion system 100 of FIG. 2. For purposes of explanation, the method 600 is described primarily with respect to the hybrid electric propulsion system 100 of FIG. 2; however, it will be understood that the method 600 can be performed on other configurations (not depicted).

Method 600 pertains to the controller 256 executing embedded code for the power transfer control 266 to control components of the hybrid electric system control effectors 240. At block 602, controller 256 can determine a target operating condition of a low pressure compressor 44 to achieve a compressor stability margin in a gas turbine engine 120 including a low speed spool 30 and a high speed spool 32, where the low speed spool 30 includes the low pressure compressor 44 and a low pressure turbine 46, and the high speed spool 32 includes a high pressure compressor 52 and a high pressure turbine 54. The target operating condition of the low pressure compressor 44 can be determined by the controller 256 with respect to one or more engine properties that enable an estimate of stability of the low pressure compressor. The one or more engine properties can include one or more of: a vane angle, a compressor corrected speed, a compressor pressure ratio, a compressor flow corrected at compressor inlet properties, and a compressor flow corrected at compressor exit properties. The one or more engine properties can be used as a proxy for stability in making stability estimates by the controller 256. The target operating condition can be based on a target pressure ratio 310 of the low pressure compressor 44 associated with a low pressure compressor corrected air flow 312. Further, the target operating condition can include a target pressure ratio 310 associated with a combination of a low pressure compressor corrected air flow and a vane angle of the stator vanes 45, 55.

At block 604, the controller 256 can determine a current operating condition of the low pressure compressor 44. The current operating condition can include a current pressure ratio of the low pressure compressor 44, such as a ratio relating the input pressure at the low pressure compressor 44 to a midpoint between the low pressure compressor 44 and the high pressure compressor 52 or an output of the high pressure compressor 52. The current operating condition can also include a current corrected flow.

At block 606, the controller 256 can control a power transfer between an electric generator 213A of the low speed spool 30 and an electric motor 212B of the high speed spool 32 to adjust the current operating condition of the low pressure compressor 44 based on the target operating condition. The low pressure compressor corrected air flow 312 and the current pressure ratio can be adjusted based on the target pressure ratio (e.g., control to correspond with line 306).

At block 608, the controller 256 can adjust the target operating condition. The target operating condition can be adjusted based on a state change or parameter that modifies compressor performance. For instance, the target operating condition can be adjusted based on a rate of change in speed 412 of the low pressure compressor 44. For example, the controller 256 can be further configured to adjust the target pressure ratio based on a rate of change in speed 412 of the low pressure compressor 44. Rate changes can be used for predictive controls as one or more additional state parameters. The method 600 can loop back to block 604 and continue making adjustments and updating the target operating condition as the gas turbine engine 120 changes operating conditions with respect to speed 412, thrust 512, or other such parameters.

In embodiments, an exhaust gas temperature 510 of the gas turbine engine 120 (as well as other hot section temperatures) can be reduced based on transferring power between the electric generator 213A of the low speed spool 44 and the electric motor 212B of the high speed spool 32 while maintaining a substantially constant thrust 512. Further, various power transfer options can be implemented to assist in control operations. For instance, power from the electric generator 213A can be transferred to an energy storage system 218. Power from the energy storage system 218 can be transferred to the electric motor 212B. Transferring of power from the electric generator 213A to the electric motor 212B of the high speed spool 32 can be performed absent a change in output of a low pressure compressor vane actuator 228 of the gas turbine engine 120. In some embodiments, one or more stages of variable vanes 45, 55 can be removed where compressor operability control can be fully managed by power transfers using one or more of the electric motors 212A, 212B and electric generators 213A, 213B. Additionally, rotational power can be transferred between the low speed spool 30 and either the electric generator 213A or a low speed spool electric motor 212A through a first mechanical power transmission 150A. Further, rotational power can be transferred between the high speed spool 32 and either the electric motor 212B or a high speed spool electric generator 213B through a second mechanical power transmission 150B.

While the above description has described the flow process of FIG. 7 in a particular order, it should be appreciated that unless otherwise specifically required in the attached claims that the ordering of the steps may be varied. Also, it is clear to one of ordinary skill in the art that, the stability enhancement provided by the dynamic torque and power capability of the coupled electric motor system described herein can be combined with and enhance other surge control features, such as surge control valves, variable stators, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric propulsion system comprising:
    a gas turbine engine comprising a low speed spool and a high speed spool, the low speed spool comprising a low pressure compressor and a low pressure turbine, and the high speed spool comprising a high pressure compressor and a high pressure turbine;
    an electric generator coupled to the low speed spool and configured to extract power from the low speed spool;
    an electric motor coupled to the high speed spool and configured to augment rotational power of the high speed spool; and
    a controller configured to:
        determine a target operating condition of the low pressure compressor to achieve a compressor stability margin in the gas turbine engine;
        determine a current operating condition of the low pressure compressor; and
        control a power transfer from the electric generator of the low speed spool to the electric motor of the high speed spool to adjust the current operating condition based on the target operating condition that reduces a pressure ratio of the low compressor.

2. The hybrid electric propulsion system of claim 1, wherein the target operating condition of the low pressure compressor is determined by the controller with respect to one or more engine properties used to estimate stability of the low pressure compressor.

3. The hybrid electric propulsion system of claim 2, wherein the one or more engine properties comprise one or more of: a vane angle, a compressor corrected speed, a compressor pressure ratio, a compressor flow corrected at compressor inlet properties, and a compressor flow corrected at compressor exit properties.

4. The hybrid electric propulsion system of claim 2, wherein the target operating condition is based on a target pressure ratio of the low pressure compressor associated with a low pressure compressor corrected air flow, the current operating condition comprises a current pressure ratio of the low pressure compressor and a current corrected flow, and the low pressure compressor corrected air flow and the current pressure ratio are adjusted based on the target pressure ratio.

5. The hybrid electric propulsion system of claim 4, wherein the controller is further configured to adjust the target pressure ratio based on a rate of change in speed of the low pressure compressor.

6. The hybrid electric propulsion system of claim 1, wherein an exhaust gas temperature of the gas turbine engine is reduced based on transferring power from the electric generator of the low speed spool to the electric motor of the high speed spool while maintaining a substantially constant thrust.

7. The hybrid electric propulsion system of claim 1, wherein the controller is further configured to transfer power from the electric generator to an energy storage system.

8. The hybrid electric propulsion system of claim 7, wherein the controller is further configured to transfer power from the energy storage system to the electric motor.

9. The hybrid electric propulsion system of claim 1, wherein the controller is further configured to transfer power from the electric generator to the electric motor of the high speed spool absent a change in output of a low pressure compressor vane actuator of the gas turbine engine.

10. The hybrid electric propulsion system of claim 1, wherein the target operating condition comprises a target pressure ratio associated with a combination of low pressure compressor corrected air flow and vane angle.

11. A method for controlling a hybrid electric propulsion system, the method comprising:
    determining, by a controller, a target operating condition of a low pressure compressor to achieve a compressor stability margin in a gas turbine engine comprising a low speed spool and a high speed spool, the low speed spool comprising the low pressure compressor and a low pressure turbine, and the high speed spool comprising a high pressure compressor and a high pressure turbine;

determining, by the controller a current operating condition of the low pressure compressor; and controlling a power transfer from an electric generator coupled to the low speed spool to an electric motor coupled to the high speed spool to adjust the current operating condition of the low pressure compressor based on the target operating condition that reduces a pressure ratio of the low compressor.

12. The method of claim 11, wherein the target operating condition of the low pressure compressor is determined by the controller with respect to one or more engine properties used to estimate stability of the low pressure compressor.

13. The method of claim 12, wherein the one or more engine properties comprise one or more of: a vane angle, a compressor corrected speed, a compressor pressure ratio, a compressor flow corrected at compressor inlet properties, and a compressor flow corrected at compressor exit properties.

14. The method of claim 12, wherein the target operating condition is based on a target pressure ratio of the low pressure compressor associated with a low pressure compressor corrected air flow, the current operating condition comprises a current pressure ratio of the low pressure compressor and a current corrected flow, and the low pressure compressor corrected air flow and the current pressure ratio are adjusted based on the target pressure ratio.

15. The method of claim 14, wherein the controller is further configured to adjust the target pressure ratio based on a rate of change in speed of the low pressure compressor.

16. The method of claim 11, wherein an exhaust gas temperature of the gas turbine engine is reduced based on transferring power from the electric generator of the low speed spool to the electric motor of the high speed spool while maintaining a substantially constant thrust.

17. The method of claim 11, further comprising:
transferring power from the electric generator to an energy storage system.

18. The method of claim 17, further comprising:
transferring power from the energy storage system to the electric motor.

19. The method of claim 11, further comprising:
transferring power from the electric generator to the electric motor of the high speed spool absent a change in output of a low pressure compressor vane actuator of the gas turbine engine.

20. The method of claim 11, wherein the target operating condition comprises a target pressure ratio associated with a combination of low pressure compressor corrected air flow and vane angle.

* * * * *